United States Patent
Baharav

(10) Patent No.: US 7,207,601 B2
(45) Date of Patent: Apr. 24, 2007

(54) ELECTROFUSION COUPLING PARTICULARLY USEFUL FOR COUPLING PLASTIC PIPES

(75) Inventor: Nimrod Baharav, D.N. menashe (IL)

(73) Assignee: Plasson Ltd., Maagan Michael-Doar-Na Menashe (IL)

(*) Notice: Subject to any disclaimer, the term of this patent is extended or adjusted under 35 U.S.C. 154(b) by 0 days.

(21) Appl. No.: 10/546,402

(22) PCT Filed: Feb. 12, 2004

(86) PCT No.: PCT/IL2004/000137

§ 371 (c)(1), (2), (4) Date: Aug. 18, 2005

(87) PCT Pub. No.: WO2004/074724

PCT Pub. Date: Sep. 2, 2004

(65) Prior Publication Data

US 2006/0076773 A1    Apr. 13, 2006

(30) Foreign Application Priority Data

Feb. 23, 2003    (IL) .................................... 154578

(51) Int. Cl.
*F16L 27/04*    (2006.01)

(52) U.S. Cl. .................... 285/21.2; 285/261; 285/197; 285/146.1; 285/146.3

(58) Field of Classification Search ............... 285/21.2, 285/261, 197, 146.1, 146.3
See application file for complete search history.

(56) References Cited

U.S. PATENT DOCUMENTS

| 1,838,249 | A |   | 12/1931 | Brown |
| 5,156,420 | A |   | 10/1992 | Bokor et al. |
| 5,375,889 | A | * | 12/1994 | Nakashiba et al. ........ 385/21.2 |
| 5,951,058 | A | * | 9/1999  | Dickinson et al. ......... 285/21.2 |

FOREIGN PATENT DOCUMENTS

| CH | 528697   | 11/1972 |
| JP | 2-253094 | 10/1999 |

* cited by examiner

*Primary Examiner*—David Bochna

(57) ABSTRACT

An electrofusion coupling for coupling a first device to a second device, includes a first part having an outer end for coupling to the first device, and an inner end formed with a surface of a curved configuration; and a second part having an end engaging the inner end of the first part and formed with a surface of a complementary curved configuration as the first part. The curved configurations of the two parts is such that the second part may be pivoted to locate its longitudinal axis at different angles with respect to the longitudinal axis of the first part. At least one of the parts is of a thermoplastic material and includes an electrical heater coil embedded along its curved surface for fixing by electrofusion the angular position of the second part with respect to the first part.

22 Claims, 4 Drawing Sheets

ELECTROFUSION COUPLING PARTICULARLY USEFUL FOR COUPLING PLASTIC PIPES

RELATED PATENT APPLICATION

This application is a National Phase Application of PCT/IL2004/000137 having International Filing Date of 12 Feb. 2004, which claims the benefit of Israeli Patent Application No. 154578 filed 23 Feb. 2003. The contents of the above Application are all incorporated herein by reference

FIELD AND BACKGROUND OF THE INVENTION

The present invention is related to electrofusion couplings for coupling a first device to a second device. The invention is particularly useful in electrofusion couplings for coupling plastic pipes to other devices, e.g., another plastic pipe, a saddle, a spigot or connector; and the invention is therefore described below particularly with respect to such applications.

Plastic pipes for conducting fluids are commonly joined by electrofusion wherein an electrofusion sleeve is applied over the pipe ends to be joined and is electrically energized to heat-fuse or weld the plastic sleeve to the pipe ends. When a plurality of pipe sections are thus joined together by electrofusion to form a continuous line, it is critical that the longitudinal axes of the pipe sections where joined together be perfectly aligned as any deviation from perfect alignment will cause the pipe sections to bend and thereby to produce tension stresses on one side of the bend and compressional stresses on the opposite side of the bend. Such bending stresses, which can result in early rupture of the plastic pipe, are frequently difficult to avoid particularly when joining together short sections of pipe, or when traversing a curve in the pipeline. In such cases, it is frequently necessary to insert specially-dimensioned angular sections or elbows to accommodate bends without introducing stresses in the joined pipe sections. This significantly increases the manufacturing costs, as well as the inventory and maintenance costs, of the pipe line.

Similar problems may also be involved where a plastic pipe is to be joined to a saddle, e.g. for receiving another plastic pipe thereacross, or where the plastic pipe is to be joined to a spigot or connector for connection to another device.

OBJECTS AND BRIEF SUMMARY OF THE PRESENT INVENTION

An object of the present invention is to provide an electrofusion coupling which can be used for accommodating misalignment between pipe sections to be joined by the electrofusion coupling without introducing such stresses in the pipe sections or other devices to be joined. While the invention is particularly useful in an electrofusion coupling for joining a plastic pipe to another plastic pipe, or to another plastic device, it can also be used for coupling other types of devices together by electrofusion in a manner to accommodate misalignment between the two devices while maintaining the integrity of the electrofusion system.

According to a broad aspect of the present invention, therefore, there is provided an electrofusion coupling for coupling a first device to a second device, comprising: a first part having an outer end for coupling to the first device, and an inner end formed with a surface of a curved configuration; and a second part having an end engaging the inner end of the first part and formed with a surface of a complementary curved configuration as the first part, the curved configurations of the two parts being such that the second part may be pivoted to locate its longitudinal axis at different angles with respect to the longitudinal axis of the first part; at least one of the parts being of a thermoplastic material and including an electrical heater coil embedded therein along its curved surface for fixing by electrofusion the angular position of the second part with respect to the first part.

According to a more specific aspect of the present invention, there is provided an electrofusion coupling for coupling a first device to a second device, comprising: a first part of thermoplastic material having an outer end for coupling the first device, and an inner end formed with a surface of spherical configuration; and a second part also of thermoplastic material having an end engaging the inner end of the first part and formed with a surface of complementary spherical configuration as the first part, the curved configurations of the two parts being such that the second part may be universally pivoted to locate its longitudinal axis in different planes and at different angles with respect to the longitudinal axis of the first part; at least one of the parts including an electrical heater coil embedded therein along the spherical surface thereof for fixing the angular position of the second part with respect to the first part by electrofusion.

In the preferred embodiments of the invention described below, the outer end of the first part is formed with a bore of cylindrical configuration, and the first device is a plastic pipe to be received within the bore of the first part and to be fixed therein by electrofusion.

In one preferred embodiment of the invention described below, the end of the second part opposite to that receiving the first part is formed with an outer surface of curved configuration, and the coupling further comprises a third part including an outer end for coupling to the second device, and an inner end formed with an inner surface of complementary curved configuration as the outer surface at the opposite end and of the second part so as to be rotatable therein to different angular positions with respect to the second part. In the described preferred embodiment, the third part is also of a thermoplastic material, and the outer end of the third part also includes an electrical heater coil embedded therein for coupling to the second device also by electrofusion.

In a second described preferred embodiment, the end of the second part opposite to that received within the first part is of a saddle shape for receiving the second device.

In a described third embodiment, the end of the second part opposite to that received within the first part is of tubular shape, e.g., to serve as a spigot or as a connector, for coupling to the second device.

In the three preferred embodiments referred to above, the surface of curved configuration of the first part is the inner surface at the inner end of the first part, and the surface of complementary curved configuration of the second part is the outer surface at the end of the second part which is received within the inner curved surface at the inner end of the first part.

A fourth embodiment of the invention is also described below, wherein the surface of curved configuration of the first part is the outer surface at the inner end of the first part, and the surface of complementary curved configuration of the second part is the inner surface at the end of the second part which receives the inner curved surface at the inner end of the first part.

As will be described more particularly below, an electrofusion coupling constructed in accordance with the foregoing features allows two devices, such as plastic pipes, to be coupled together by electrofusion in a manner which accommodates non-alignment and which permits the two devices to be pivoted to different angles with respect to each other as may be desired for a specific application.

Further features and advantages of the invention will be apparent from the description below.

BRIEF DESCRIPTION OF THE DRAWINGS

The invention is herein described, by way of example only, with reference to the accompanying drawings, wherein:

FIG. 5 illustrates a two-part electrofusion coupling constructed in accordance with the present invention, for coupling a plastic pipe to a tubular device, such as a spigot or connector to serve as an outlet tap or the like;

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

Figure 1:
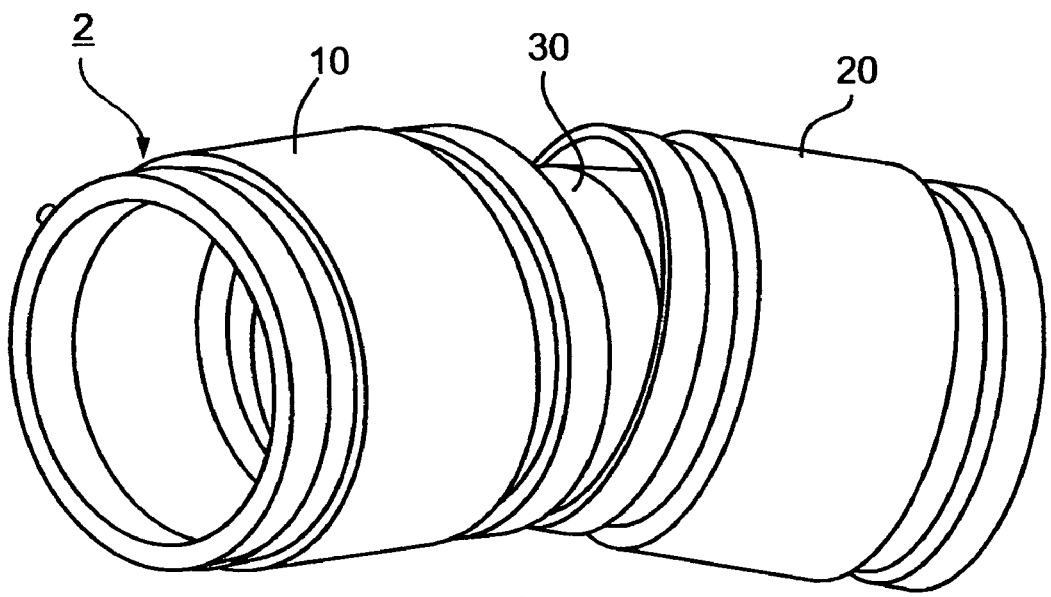
FIG. 1 illustrates a three-part electrofusion coupling constructed in accordance with the present invention for coupling together two plastic pipes.
Figure 2:
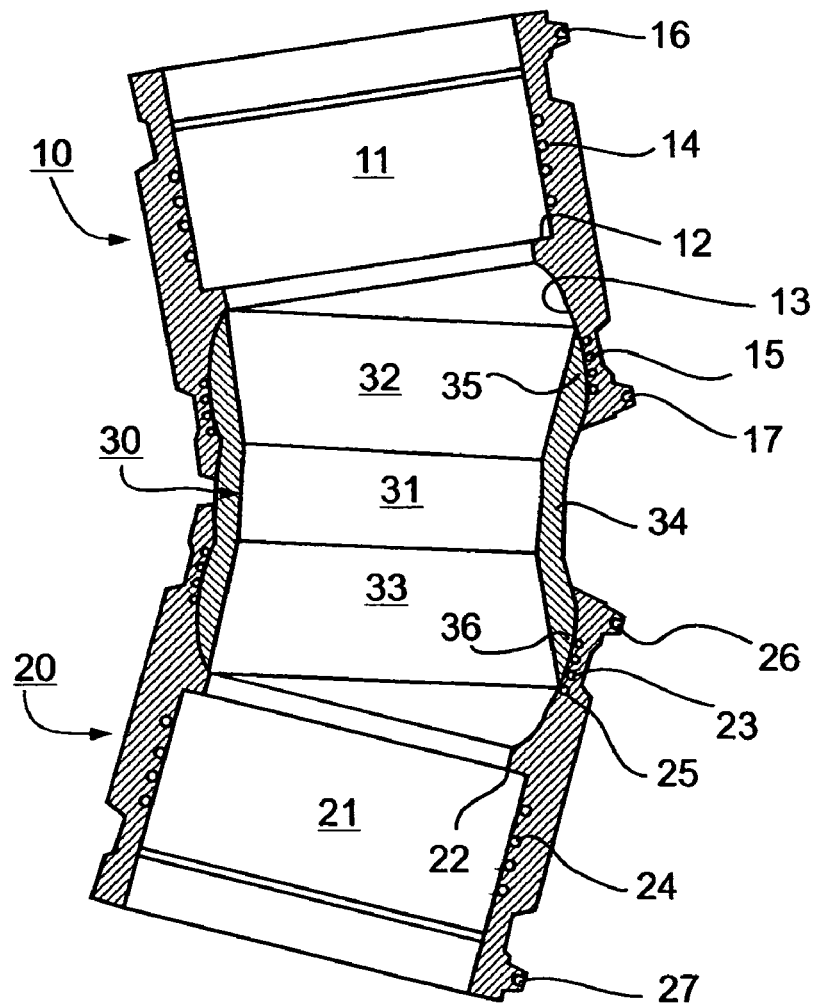
FIG. 2 is a longitudinal sectional view of the electrofusion coupling of FIG. 1.

FIGS. 1 and 2 illustrate a three-part coupling, generally designated 2, for coupling together two plastic tubes (not shown) such as to permit the longitudinal axes of the two plastic pipes 2 to be located at any desired angle with respect to each other in the same plane, or in different planes, according to the requirements of the specific application.

The illustrated electrofusion coupling 2 includes a first part 10 at one end for receiving one of the plastic pipes, and a second part 20 at the opposite end for receiving the second plastic pipe. It further includes a third, intermediate part 30 coupling the two parts 10 and 20 together such as to permit each part to be universally pivoted with respect to the other part to any desired angle within a predetermined range.

Thus, part 10 of electrofusion coupling 2 is formed at its outer end with a cylindrical bore 11 for receiving its respective plastic pipe (not shown). Part 10 is further formed with an inner annular shoulder 12 to serve as an abutment for locating the received plastic pipe. The opposite end of part 10 is formed with a concavely-curved inner surface 13 for receiving the respective end of the intermediate part 30 such as to permit parts 10 and 30 to be pivoted to different angular positions with respect to each other, as will be described more particularly below.

Part 10 further includes an electrical heater coil 14 at the outer end of the part to receive the plastic pipe, and another electrical heater coil 15 at the opposite end to receive the respective end of the intermediate part 30. The two electrical coils 14 and 15 are connected in series between two electrical terminals 16 and 17. In some applications, however, it may be desirable to connect each of the two electrical coils 14, 15 to a separate pair of terminals in order to enable them to be energized separately, or together, as desired.

Part 20 at the opposite end of the electrofusion coupling 2 is similarly formed with: a cylindrical bore 21 for receiving the other plastic pipe (not shown); an annular shoulder 22 serving as an abutment for the received plastic pipe; an inner concavely-curved surface 23 at the opposite end of the part for receiving the respective end of the intermediate coupling 30; an electrical heater coil 24 at the end of the part to receive the plastic pipe; an electrical heater coil 25 at the opposite end of the part to receive the intermediate coupling part 30; and a pair of electrical terminals 26 and 27 for energizing the two heater coils 24 and 25.

The intermediate part 30 of the electrofusion coupling 2 is formed with a bore therethrough consisting of a cylindrical section 31 at its center, and two conical sections at its opposite ends 32, 33. The outer surface of the central section 31 is cylindrical, as shown at 34. The outer surfaces of the two ends 32, 33, are convexly-curved, as shown at 35 and 36, respectively, with a curvature complementary to that of the concavely-curved inner surfaces 13, 23 of the two end parts 10, 20.

In the preferred embodiment of the invention illustrated in FIGS. 1 and 2, the complementary curved surfaces (13 of part 10, and 35 of part 30 at one end; and 23 of part 20 and 36 of part 30 at the opposite end) are preferably of a spherical configuration so as to allow the two end parts 10, 20, to be universally pivotable with respect to the intermediate part 30 to different angular positions in different planes. It is contemplated, however, that in some applications, it may suffice to pivot the two pipes to be coupled to different angular positions with their longitudinal axes in the same plane, in which case these curved surfaces could be cylindrical, rather than spherical.

The manner of using the electrofusion coupling illustrated in FIGS. 1 and 2 will be apparent from the above description. Thus, one of the pipes to be coupled is inserted within bore 11 of part 10 until its end abuts annular shoulder 12; and the other pipe to be coupled is inserted into bore 21 of part 20 until its end abuts shoulder 22. The two pipes are then pivoted to the desired angle with respect to each other. Electrical coils 14 and 15 are energized via terminals 16 and 17 to electrofuse part 10 with respect to its received plastic pipe and the intermediate part 30; and electrical coils 24 and 25 are energized via their respective terminals 26 and 27 to electrofuse part 20 with respect to the second pipe and intermediate part 30 of the electrofusion coupling.

Figure 3:
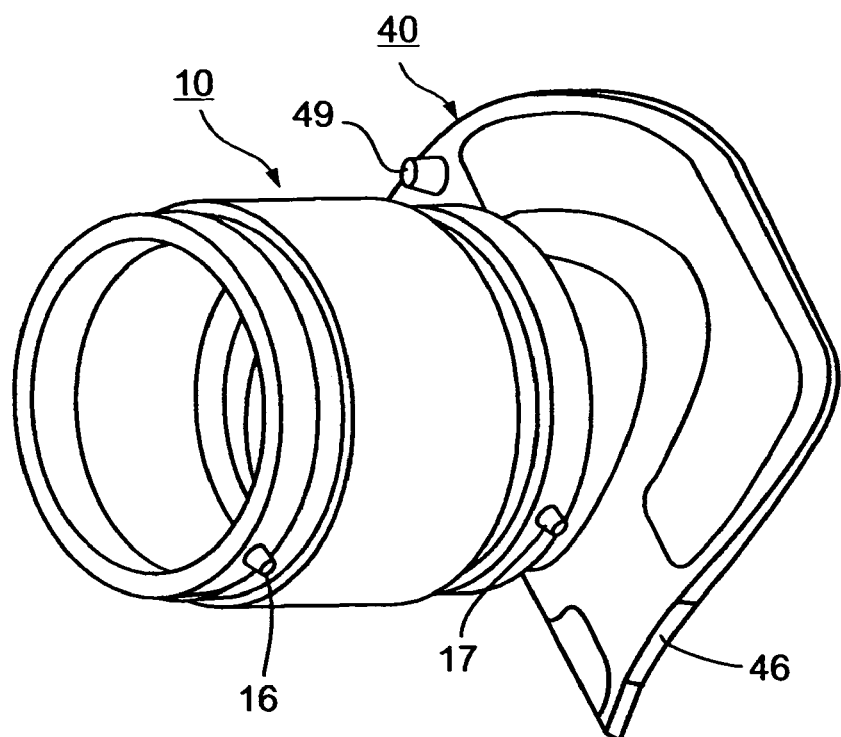
FIG. 3 illustrates a two-part electrofusion coupling constructed in accordance with the present invention for coupling a plastic pipe to a saddle.
Figure 4:
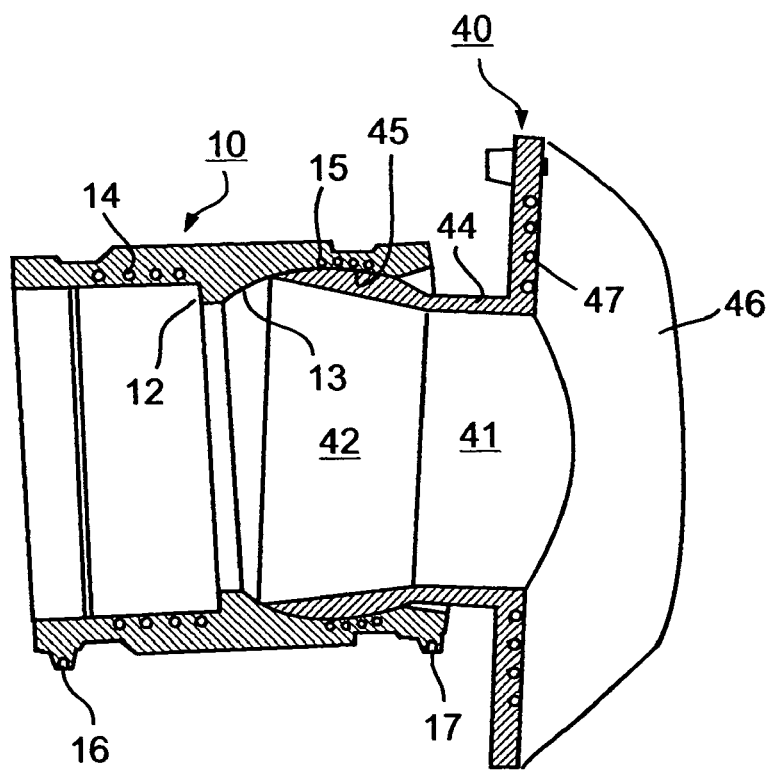
FIG. 4 is a longitudinal sectional view of the electrofusion coupling of FIG. 3.

FIGS. 3 and 4 illustrate a two-part saddle-type electrofusion coupling for coupling a plastic pipe to a saddle, e.g., for mounting another pipe at right-angles to it as in a T-fitting. One of its two parts, namely, that for receiving one pipe, is the same as part 10 in FIGS. 1 and 2, and therefore that part and its components are identified by the same reference numerals. The other part is designed to serve as the saddle, and is generally designated 40 in FIGS. 3 and 4.

The second part 40 illustrated in FIGS. 3 and 4 is formed at one end with a construction similar to the respective end of the intermediate part 30 in FIG. 2. Thus, part 40 is formed with a bore having a central cylindrical section 41 and an outer conical section 42 corresponding to bore sections 31 and 32 in FIG. 2. Part 40 is further formed with an outer surface having a central section 44 of cylindrical configuration and an end section 45 of convexly-spherical configuration, corresponding to outer surface 23 in FIG. 2.

The opposite end of part 40 of the electrofusion coupling illustrated in FIGS. 3 and 4 is formed as a curved saddle, as shown at 46, extending perpendicularly to and communicating with bore section 41 of that part. Saddle section 46 of part 40 includes electrical heater coils 47 and 48 at the opposite sides of bore section 41, adapted to be energized via a pair of electrical terminals 49, only one of which is seen in FIGS. 3 and 4.

The manner of using the electrofusion coupling illustrated in FIGS. 3 and 4 will be apparent from the above description. Thus, one pipe is inserted into part 10 of the coupling, as described above with respect to FIGS. 1 and 2, and the other pipe is applied across the curved saddle 46 of part 40. Part 40 is then pivoted to the desired angular position with respect to part 10. Heater coils 14 and 15 are then electrically energized to electrofuse the two parts in the pivoted angular position, and also to electrofuse the plastic pipe within part 10. Electrical heater coil 47 may then be energized to electrofuse the plastic pipe within the saddle section 46 of part 40.

Figure 5:
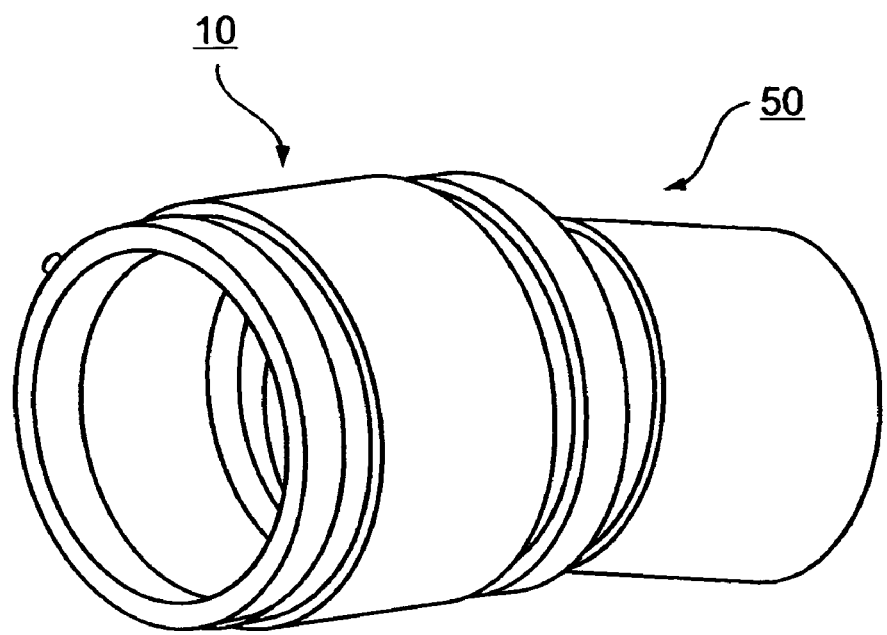
Figure 6:
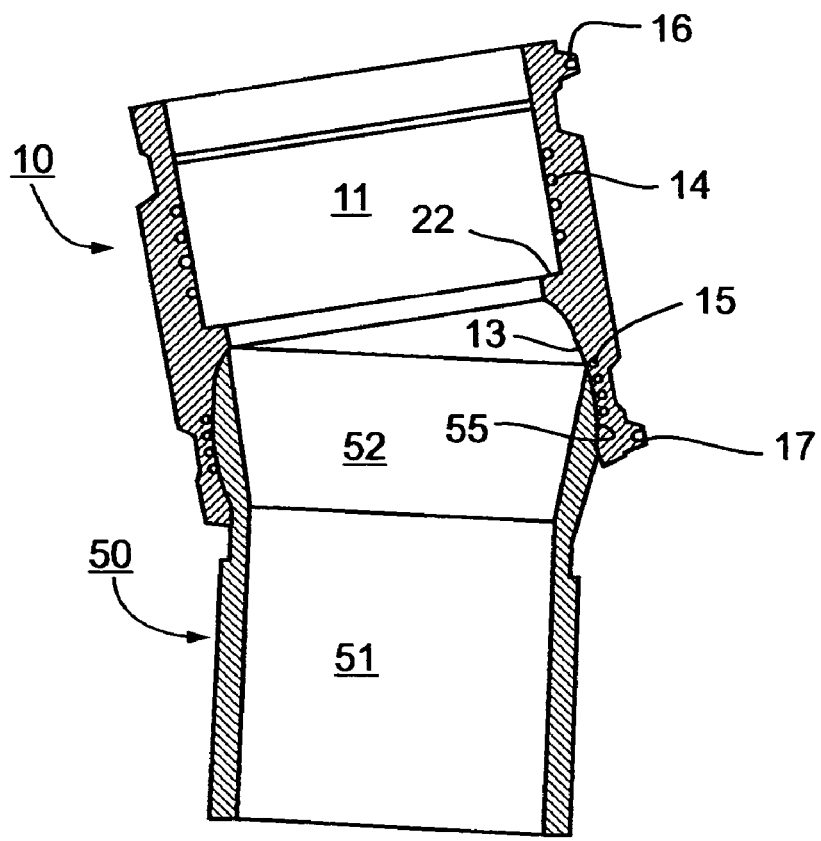
FIG. 6 is a longitudinal sectional view illustrating the electrofusion coupling of FIG. 5.

FIGS. 5 and 6 illustrate a two-part electrofusion coupling in which one part, that for receiving a plastic pipe, is of the same construction as part 10 in FIGS. 1, 2 and 3, 4, respectively; that part and its components are therefore identified by the same reference numerals. The second part, identified as 50 in FIGS. 5 and 6, is pivotally mounted at one end to part 10, and is formed at its opposite end into a tubular configuration for use, for example, as a spigot, connector, or the like, to serve as an outlet (or inlet) for the fluid conducted within the plastic pipe.

Thus, as shown in FIGS. 5 and 6, part 50 is formed with a bore therethrough having a cylindrical section 51 and a conical section 52 at one end, the latter being formed with an outer surface 55 of convexly spherical configuration, corresponding to spherical surface 45 in FIG. 4, for pivotal movement within the concavely-spherical surface 13 of part 10. Thus, part 50 may be pivoted to any desired position with respect to part 10, and electrofused in that position by electrically energizing the electrical heater coils 14 and 15 of part 10, in the same manner as described above.

Figure 7:
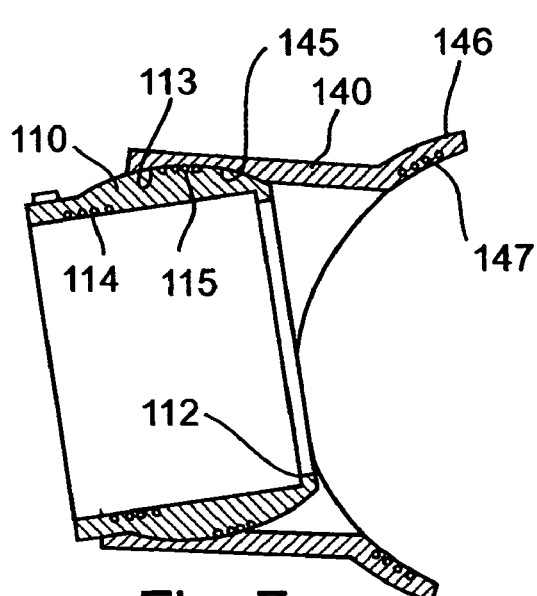
FIG. 7 is a longitudinal section view illustrating another two-part electrofusion coupling constructed in accordance with the present invention for coupling a plastic pipe to a saddle.
Figure 8:
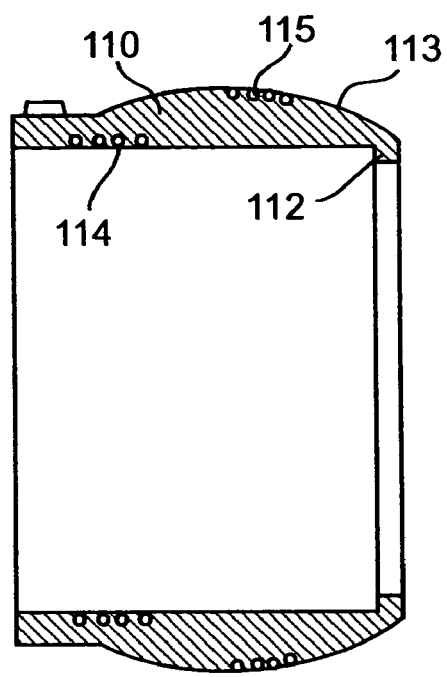
FIG. 8 is an enlarged sectional view illustrating one of the parts in the electrofusion coupling of FIG. 7.

FIGS. 7 and 8 illustrate a two-part saddle-type coupling similar to that of FIGS. 3 and 4, except that in this case the spherical surfaces, which permit one part to be pivoted with respect to the other, are reversed in the two parts. Thus, one of the parts, that indicated 110 in FIGS. 7 and 8, is of similar construction as part 10 in FIGS. 3 and 4, except that the spherical surface, therein designated 113, is convexly-formed on the outer surface of part 110, rather than concavely-formed on its inner surface; and the spherical surface engaged thereby by the second part 140 is concavely-formed on its inner surface, as shown at 145, rather than on its outer surface. In all other respects, the two-part electrofusion coupling illustrated in FIGS. 7 and 8 may be constructed in the same manner as described above with respect to FIGS. 3 and 4 with the annular shoulder 112 for locating the plastic pipe to be inserted into part 110, the heater coils 114, 115 for electrofusing the pipe to part 110 and part 110 to part 140, and heater coil 147 for electrofusing the other pipe to the saddle 146.

It will be appreciated that a similar modification can be made to the electrofusion couplings illustrated in FIGS. 1, 2 and 4, 5, respectively, namely by providing the spherical surface of part 10 on the outer surface of that part, rather than on the inner surface, and by providing the spherical surface of the second part on the inner surface of that part rather than on the outer surface.

Figure 9:
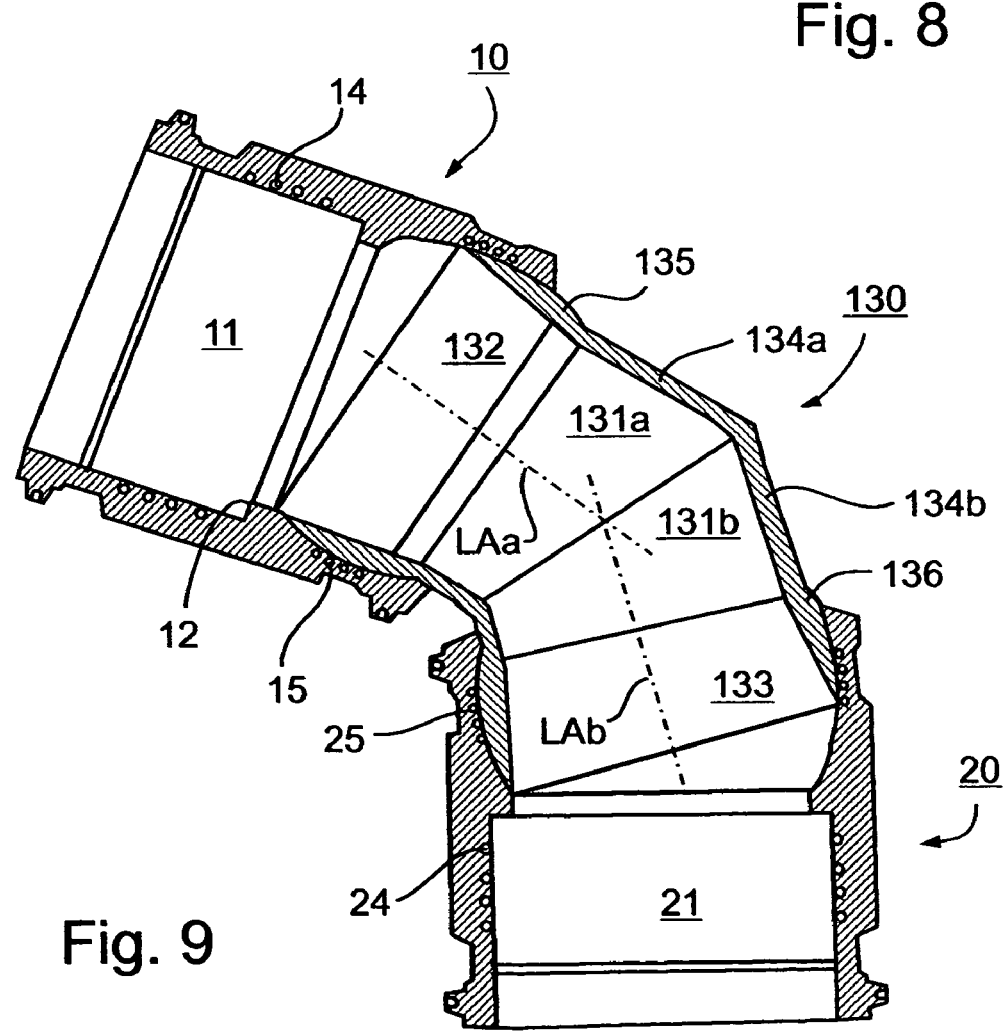
FIG. 9 illustrates a modification in the three part electrofusion coupling of FIGS. 1 and 2.

FIG. 9 illustrates a modification in the three-part coupling of FIGS. 1 and 2, particularly in the construction of the third, intermediate part, designated 30 in FIGS. 1 and 2, and 130 in FIG. 9. Since the first and second parts 10 and 20, respectively, are of the same construction as in FIGS. 1 and 2, these parts and their respective elements are identified in FIG. 9 by the same reference numerals as in FIGS. 1 and 2.

The main modification in the FIG. 9 construction is that, whereas in FIGS. 1 and 2 the inner and outer ends 32, 33 of the third, intermediate part 30 have a common longitudinal axis, the outer ends 132, 133 of part 130 in FIG. 9 have longitudinal axes LAa, LAb, respectively, at an angle to each other. Accordingly, part 130 will also have two central cylindrical sections 131a, 131b and two outer cylindrical surfaces 134a, 134b, both at the same angle with respect to each other. By thus providing a fixed angular bend in the third, intermediate part 130, the electrofusion coupling of FIG. 9 is capable of accommodating larger angular displacements between the two pipes to be coupled together.

While the invention has been described with respect to several preferred embodiments, it will be appreciated that many other variations and applications may be made. For example, while the two electrical coils (e.g., 14, 15 shown in FIG. 2) are connected in series to a common pair of terminals (e.g. 16, 17), they may be connected in parallel, or to a separate pair of terminals. In addition, the two or three parts could be fixed to each other at the desired angular position by electrofusion, while one or both of the coupled devices (e.g., plastic pipes, saddles, etc.) could be fixed to the respective end of the coupling by mechanical means, such as a compressional, split-ring type mechanical couplings, according to the particular application. Many other variations, modifications and applications of the invention will be apparent.

What is claimed is:

1. An electrofusion coupling for coupling a first device to a second device, comprising:
    a first part having a first end for coupling to said first device, and a second end formed with a surface of a curved configuration;
    and a second part having an end engaging said second end of the first part and formed with a surface of a complementary curved configuration as said first part, the curved configurations of the two parts being such that said second part may be pivoted to locate its longitudinal axis at different angles with respect to the longitudinal axis of said first part;
    at least one of said parts being of a thermoplastic material and including an electrical heater coil embedded therein along its curved surface for fixing by electrofusion the angular position of said second part with respect to said first part.

2. The electrofusion coupling according to claim 1, wherein said curved configurations of said second end of the first part and said end of the second part are spherical configurations so as to allow said second part to be universally pivoted to locate its longitudinal axis in different planes and at different angles with respect to the longitudinal axis of the first part.

3. The electrofusion coupling according to claim 1, wherein at least said first part is of a thermoplastic material, and said first end of the first part also includes an electrical heater coil embedded therein for coupling to said first device also by electrofusion.

4. The electrofusion coupling according to claim 3, wherein said first end of said first part is formed with a bore of cylindrical configuration, and said first device is a plastic pipe to be received within said bore of said first part and to be fixed therein by electrofusion.

5. The electrofusion coupling according to claim 1, wherein said surface of curved configuration of said first part is the inner surface at the second end of the first part, and said surface of complementary curved configuration of said second part is the outer surface at the end of the second part which is received within said inner curved surface at the second end of the first part.

6. The electrofusion coupling according to claim 1, wherein said surface of curved configuration of said first part is the outer surface at the second end of the first part, and said surface of complementary curved configuration of said second part is the inner surface at the end of the second part which receives said inner curved surface at the second end of the first part.

7. The electrofusion coupling according to claim 1, wherein the end of said second part opposite to that receiving said first part is formed with an outer surface of curved configuration; and wherein said coupling further comprises a third part including a first end for coupling to said second device, and a second end formed with an inner surface of complementary curved configuration as the outer surface at said opposite end and of said second part so as to be pivotable therein to different angular positions with respect to said second part.

8. The electrofusion coupling according to claim 7, wherein said curved configurations of said opposite end of the second part and said second end of the third part are spherical configurations so as to allow said third part to be universally pivotable to different angular positions with respect to said second part.

9. The electrofusion coupling according to claim 7, wherein said third part is also of a thermoplastic material, and said first end of said third part also includes an electrical heater coil embedded therein for coupling to said second device also by electrofusion.

10. The electrofusion coupling according to claim 7, wherein said second and first ends of said third part have a common longitudinal axis.

11. The electrofusion coupling according to claim 7, wherein said second and first ends of said third part have longitudinal axes at an angle to each other.

12. The electrofusion coupling according to claim 1, wherein said end of the second part opposite to that received within said first part is of a saddle shape for receiving said second device.

13. The electrofusion coupling according to claim 12, wherein at least said first part is of a thermoplastic material, and said first end of the first part also includes an electrical heater coil embedded therein for coupling to said first device also by electrofusion.

14. The electrofusion coupling according to claim 12, wherein said second part is also made of a thermoplastic material, and said opposite end of the second part also includes an electrical coil embedded therein for also fixing said second device thereto by electrofusion.

15. The electrofusion coupling according to claim 1, wherein said end of the second part opposite to that received within said first part is of tubular shape for coupling to said second device.

16. An electrofusion coupling for coupling a first device to a second device, comprising:
 a first part of thermoplastic material having a first end for coupling to said first device, and a second end formed with a surface of spherical configuration;
 and a second part also of thermoplastic material having an end engaging said second end of the first part and formed with a surface of complementary spherical configuration as said first part, the curved configurations of the two parts being such that said second part may be universally pivoted to locate its longitudinal axis in different planes and at different angles with respect to the longitudinal axis of said first part;
 at least one of said parts including an electrical heater coil embedded therein along its spherical surface for fixing the angular position of said second part with respect to said first part by electrofusion.

17. The electrofusion coupling according to claim 16, wherein said first end of said first part is formed with a bore of cylindrical configuration, and said first device is a plastic pipe to be received within said bore of said first part and to be fixed therein by electrofusion.

18. The electrofusion coupling according to claim 17, wherein the end of said second part opposite to that receiving said first part is formed with an outer surface of curved configuration; and wherein said coupling further comprises a third part including a first end for coupling to said second device, and a second end formed with an inner surface of complementary curved configuration as the outer surface at said opposite end and of said second part so as to be pivotable therein to different angular positions with respect to said second part.

19. The electrofusion coupling according to claim 18, wherein said third part is also of a thermoplastic material, and said first end of said third part also includes an electrical heater coil embedded therein for coupling to said second device also by electrofusion.

20. The electrofusion coupling according to claim 16, wherein said end of the second part opposite to that received within said first part is of a saddle shape for receiving said second device.

21. The electrofusion coupling according to claim 20, wherein said second part is also made of a thermoplastic material, and said opposite end of the second part also includes an electrical coil embedded therein for also fixing said second device thereto by electrofusion.

22. The electrofusion coupling according to claim 16, wherein said end of the second part opposite to that received within said first part is of tubular shape for coupling to said second device.

* * * * *